(12) United States Patent
Eberlein et al.

(10) Patent No.: US 7,971,209 B2
(45) Date of Patent: Jun. 28, 2011

(54) SHORTCUT IN RELIABLE COMMUNICATION

(75) Inventors: Peter Eberlein, Malsch (DE); Timm Falter, Sinsheim (DE); Volker Wiechers, Heidelberg (DE); Stefan Rossmanith, Walldorf (DE); Hartwig Seifert, Elchesheim-Illingen (DE)

(73) Assignee: SAP AG, Walldorf (DE)

( * ) Notice: Subject to any disclaimer, the term of this patent is extended or adjusted under 35 U.S.C. 154(b) by 1044 days.

(21) Appl. No.: 11/804,379

(22) Filed: May 18, 2007

(65) Prior Publication Data
US 2008/0288960 A1 Nov. 20, 2008

(51) Int. Cl.
G06F 3/00 (2006.01)
(52) U.S. Cl. .......................... 719/328; 719/330
(58) Field of Classification Search .................. 719/326, 719/330, 328
See application file for complete search history.

(56) References Cited

U.S. PATENT DOCUMENTS

| 5,684,955 | A | 11/1997 | Meyer et al. | |
|---|---|---|---|---|
| 5,956,509 | A * | 9/1999 | Kevner | 719/330 |
| 6,052,710 | A | 4/2000 | Saliba et al. | |
| 2002/0059425 | A1 | 5/2002 | Belfiore et al. | |
| 2002/0133585 | A1 * | 9/2002 | Deming | 709/224 |
| 2003/0073425 | A1 * | 4/2003 | Immonen et al. | 455/406 |
| 2005/0246715 | A1 * | 11/2005 | Herity | 719/315 |
| 2006/0168102 | A1 | 7/2006 | Faller et al. | |
| 2007/0073821 | A1 | 3/2007 | Brail | |
| 2008/0031269 | A1 * | 2/2008 | Shimizu et al. | 370/412 |

FOREIGN PATENT DOCUMENTS

| EP | 0 604 010 A1 | 6/2004 |
|---|---|---|
| EP | 1 462 941 A2 | 9/2004 |
| EP | 1 667 017 A1 | 6/2006 |

OTHER PUBLICATIONS

Fox, Messaging in Web Service Grid with Applications to Geographical Information Systems, 2005.*
Samir Djilali, P2P-RPC: Programming Scientific Applications on Peer-to-Peer Systems with Remote Procedure Call, 2003.*
Valente, Marco, et al., "Collocation optimizations in an aspect-oriented middleware system," *Science Direct*, The Journal of Systems and Software 80 (2007) 1659-1666, www.elsevier.com/locate/jss.
Communication, European Patent Office, Aug. 4, 2008.

* cited by examiner

*Primary Examiner* — Lechi Truong
(74) *Attorney, Agent, or Firm* — Mintz, Levin, Cohn, Ferris, Glovsky & Popeo, P.C.

(57) ABSTRACT

Methods and apparatus, including computer program products, are provided for messaging. In one aspect, there is provided a computer-implemented method. The method may include initiating a call from a first application to a second application. The method may determine whether the first application is local to the second application. A call may be made as a local call from the first application to the second application, when it is determined that the first and second applications are on the same computer. A call may be made as a remote call from the first application to the second application, when it is determined that the first and second applications are on separate computers. Related apparatus, systems, methods, and articles are also described.

19 Claims, 3 Drawing Sheets

SHORTCUT IN RELIABLE COMMUNICATION

FIELD

The present disclosure generally relates to messaging.

BACKGROUND

Applications often interact by exchanging messages. For example, a user interface application may interact with a Web service to query a database of products, update a description of a product, and save the updated description to the database. In this example, the order of the messages corresponding to the query, update, and save should be preserved when the messages are sent from the user interface to the database. To that end, reliable messaging mechanisms, such as WS-RM (see Web Services Reliable Messaging Protocol, February 2005, Rusian Bilorusets et al.), have been used to ensure that message delivery is guaranteed and, when necessary, delivered in a specified order. To provide reliable messaging, WS-RM specifies the protocol for message exchange including the retransmission of messages that are in error. To retransmit such messages, the sending and receiving application include a persistence mechanism (e.g., memory or storage) to store the message and a queue to maintain information concerning the order of a message relative to other messages. As a consequence, reliable messaging comes at the cost of increased processing requirements at the sender and receiver of the messages.

SUMMARY

The subject matter disclosed herein provides methods and apparatus, including computer program products, for messaging. In one aspect, there is provided a computer-implemented method. The method may include initiating a call from a first application to a second application. The method may determine whether the first application is local to the second application. A call may be made as a local call from the first application to the second application, when it is determined that the first and second applications are on the same computer. A call may be made as a remote call from the first application to the second application, when it is determined that the first and second applications are on separate computers.

Variations may include one or more of the following features. The local call may be made as a hypertext transfer protocol with a predetermined destination. The predetermined destination may have a value of none. The local call may be made by calling an application program interface to bypass queuing associated with the first application, to bypass persistence associated with the first application, and to use queuing and persistence associated with the second application. The remote call may be made using a hypertext transfer protocol including a location. The location may be at least one of a uniform resource locator or a uniform resource identifier representative of the second application. The first application may be implemented as a user interface application and the second application may be implemented as a Web service. The remote call may be made using Web Services Reliable Messaging. The location of the second application may be determined. A determination may be made that the first application is local to the second application, when the first and second applications are on the same computer. A determination may be made that the first application is remote to the second application, when the first and second applications are on separate computers coupled by a network including the Internet.

The subject matter described herein may be implemented to realize the advantage of reducing processing at a computer by eliminating mechanisms, such as persistent storage at a consumer (or client), used to provide reliable messaging between applications. The reduction in such mechanisms may improve processing performance at the computers hosting the applications.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
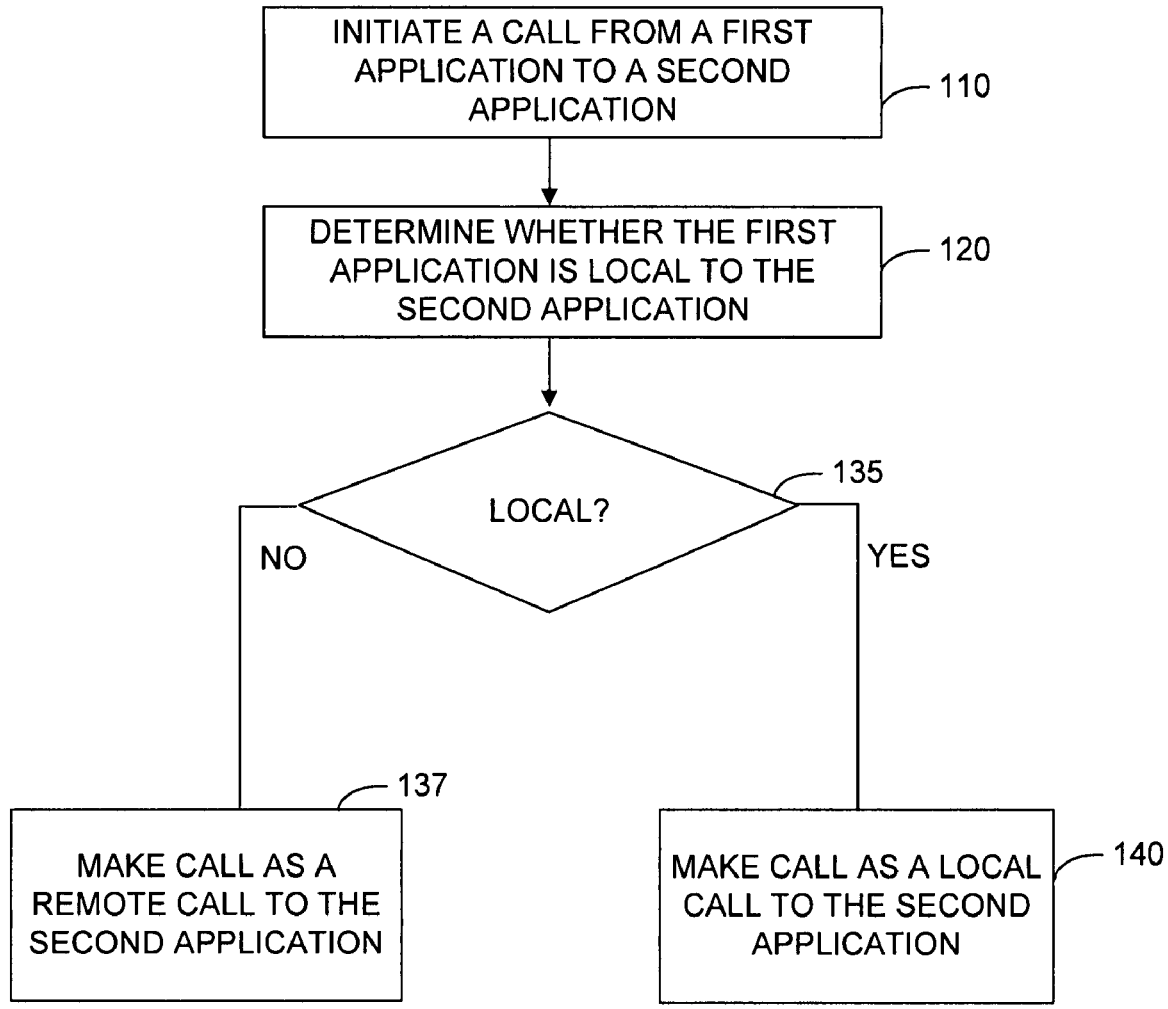
FIG. 1 depicts a process flowchart for making calls as either a local call or a remote call based on the location of applications making the calls.

Like labels are used to refer to same or similar items in the drawings.

DETAILED DESCRIPTION

When exchanging messages, the sending application and the receiving application each queue messages and persist the messages to allow for resending of a message if the transmission of the message is not successful. Since the sending application and the receiving application are usually located on separate computers coupled by a network, the use of queues and persistence serves to improve reliability by allowing messages to be sent in order and resent, when message transmission is not successful. However, when the sending application and the receiving application are deployed (e.g., installed) on the same computer or the same database system, the use of persistence and queues may introduce unnecessary overhead that can be reduced (or eliminated) without sacrificing reliable message transmission, while possibly providing performance improvements. To that end, the subject matter disclosed herein provides a remote call mechanism (e.g., including queues, persistence, and other reliable messaging mechanisms at both the sending and receiving applications) when the sending application and the receiving application are on separate computers, and provides, when the sending and receiving applications are on the same computer, a local call mechanism—a so-called "shortcut"—to reduce queuing, persistence, and reliable messaging mechanisms.

For example, in a deployment scenario where both the sending application and the receiving application are on the same database server, the sending application uses a local call (e.g., a local API (application program interface) call) to write a message directly into a queue and/or a persistence mechanism (e.g., memory) at the receiving application-bypassing queuing and persistence typically used at the sending application. On the other hand, if the sending and receiving applications are on separate computers coupled via the Internet or an intranet, the sending application may use more reliable messaging mechanisms, such as persistence, queues, as well as Web Services Reliable Messaging (WS-RM), to send a message to the receiving application. Consequently, when the sending application and the receiving application are both deployed on the same computer (e.g., locally), queuing and persistence at the sending application may be eliminated.

FIG. 1 depicts a process for making a local call from a sending application to a receiving application when the first and second applications are on the same computer and making remote calls when the first and second applications are on separate computers.

At 110, a call is initiated between a sending application and a receiving application. The sending application may be implemented as any type of software program for performing a specific task or group of tasks. For example, the sending application may be implemented as a user interface for interacting with a database application. To initiate the call, the sending application may create a request message including the identity and/or the location of the receiving application. In some implementations, a uniform resource identifier (URI) or a uniform resource locator (URL) may be used to identify the location of the receiving application. For example, the sending application may initiate a call to the receiving application using a hypertext transfer protocol (http) to the URL of the receiving application: http://www.sap.com/name_of_application. Alternatively, the sending application may initiate a call to the receiving application by performing a hypertext transfer protocol to a predetermined local destination, such as http:NONE.

At 120, the sending application may determine whether the sending application and the receiving application are on the same computer. For example, the sending application may use the URL of the receiving application to determine the location of the receiving application.

At 137, if the sending and receiving applications are on separate computers (e.g., coupled by an intranet or the Internet), the sending application sends the request message generated at 110 to the receiving application as a remote call. In some implementations, the request message is formatted as a SOAP (Simple Object Access Protocol) request message and transmitted using reliable messaging mechanisms (e.g., using persistence, queues, and WS-RM (Web Services Reliable Messaging)), although other messaging mechanisms may be used. SOAP is a lightweight XML-based (extensible markup language) messaging protocol used to encode messages sent to and by a Web service. A service, such as a Web service, is an application (also referred to as a program or a component) that can be accessed using standard protocols. Web services allow different applications from different sources to communicate with each other without custom coding by using standard protocols, such as XML, SOAP, and WSDL (Web Services Description Language). WS-RM provides a messaging protocol to send and receive messages using quality of service parameters, such as exactly once (EO) or exactly once in order (EOIO). WS-RM uses SOAP as well as other protocols, such as WSDL, to improve interoperability.

Figure 2:
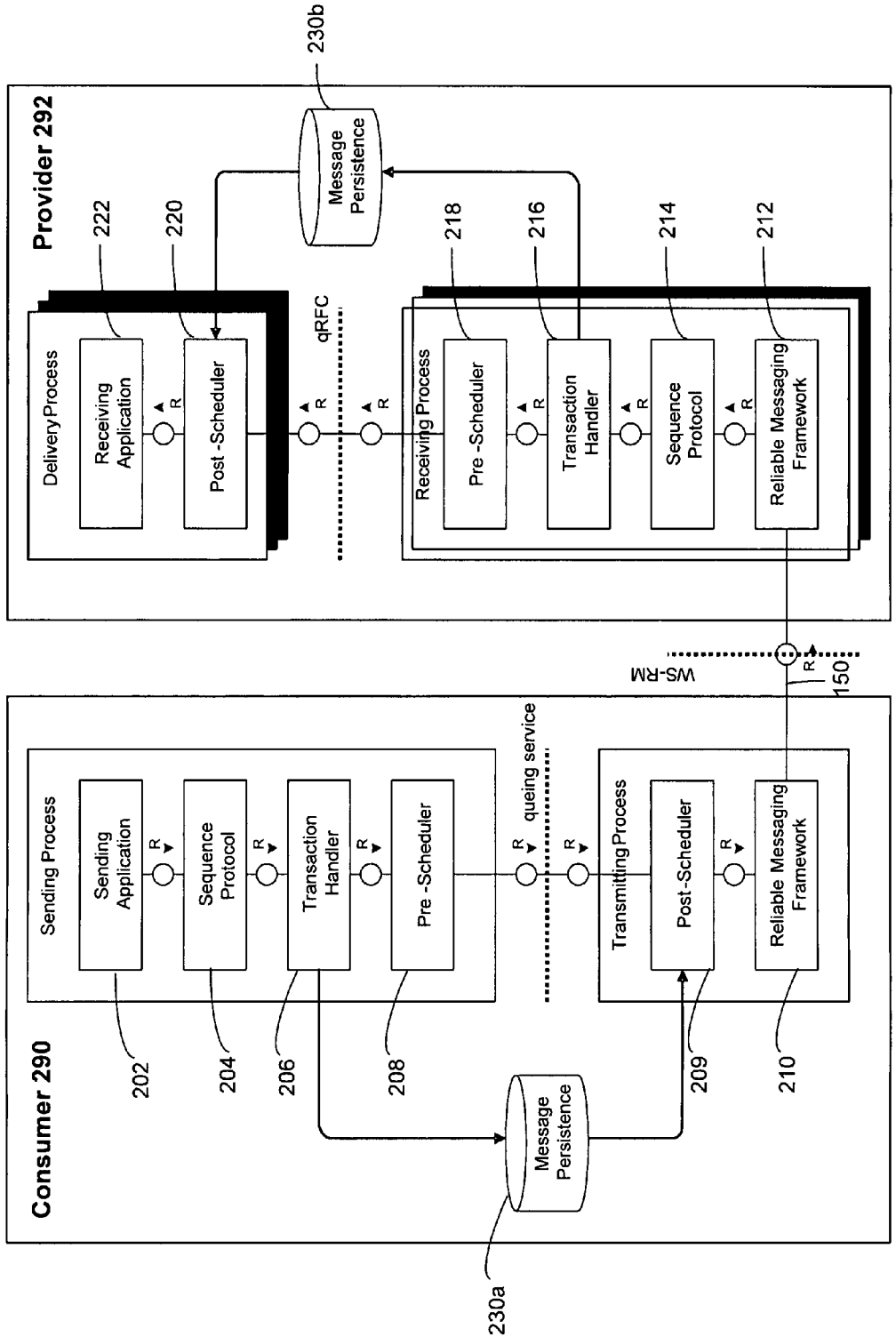
FIG. 2 is a block diagram of a system for making a remote call.

FIG. 2 depicts a system 200 depicting a consumer 290 and a provider 292 including messaging mechanisms used during a remote call, such as the remote call described above at 137. Referring to FIG. 2, consumer 290 represents a framework of one or more applications that processes requests, which are then sent to provider 292. The term "framework" refers to a group of interrelated programs. The provider 292 also represents a framework of one or more applications that receive requests from consumers and provides responses, which are then sent to a consumer 292. In some implementations, the provider 292 is implemented as a Web service, while the consumer 290 is implemented as another application, such as a user interface for interacting with the Web service.

The consumer 290 further includes a sending application 202. The sending application 202 may be implemented as any type of software program for performing a specific task or group of tasks. For example, the sending application may be implemented as a user interface for interacting with provider 292 and/or a receiving application 222. When a remote call is made by sending application 202, sending application provides the request to sequence protocol 204. The sequence protocol 204 opens a new sequence or reopens an existing sequence and collects one or more messages in that sequence. The transaction handler 206 sends all messages of a logical unit of work to message persistence mechanism 230a for storing messages, enabling sending (or resending) of messages to provider 292.

The pre-scheduler 208 processes the messages to be sent to provider 292 by scheduling for transmission the messages stored in message persistence 230a. For each sequence, there is an assigned queue. The pre-scheduler 208 may make entries in the queue to maintain the order of the messages, so that each queue entry corresponds to a location of a message stored in message persistence 230a.

Once the messages have been scheduled in a queue by pre-scheduler 208, a transmitting process calls post-scheduler 209, which reads the queue at pre-scheduler 208; retrieves messages from the message persistence 230a at the locations indicated by the queue at pre-scheduler 208; and prepares the messages for transmission.

The reliable messaging framework 210 receives the messages and formats them for transmission to network 150 and provider 292. In some implementations, the reliable messaging framework 210 formats the messages into SOAP messages and sends the SOAP messages to provider 292 through network 150. Moreover, the reliable messaging framework 210 may use WS-RM as a mechanism to send messages to provider 292.

At provider 292, a reliable messaging framework 212 receives messages from consumer 290 and formats messages for the provider 292 and receiving application 222. In some implementations, the reliable messaging framework 212 implements the WS-RM protocol and provides acknowledgements and sequence creation responses in accordance with WS-RM.

Sequence protocol 214 handles sequences by creating for each consumer side sequence (e.g., consumer 290), a corresponding provider side sequence (e.g., provider 292) to ensure delivery of the messages in a correct order. For example, when a sequence includes five messages, sequence protocol 214 handles the sequence—opening (or creating a sequence at provider 292), keeping track of the status and order of the sequence, closing the sequence when the last message is handled by provider 292, and acknowledging to reliable messaging frameworks 210 and 212 and consumer 290, when the end of the sequence occurs.

Transaction handler 216 is similar to transaction handler 206. The received messages are stored in a message persistence mechanism 230b. The message persistence 230b is similar to message persistence 230a, but stores received messages to enable recreation of the correct order of messages. For example, if messages A, B, and C are sent by consumer 290 and message B is not received or cannot be processed by provider 292 (e.g., due to an error), the message B is resent by consumer 290 by retrieving message B from message persistence 230a. While message B is being resent by consumer 290, the other messages (e.g., messages A and C) are stored and persisted at message persistence 230*b*. The sequence may be restarted, so that provider 292 processes the messages in order (e.g., message A, resent message B, and message C).

The pre-scheduler 218 then schedules the messages for processing by receiving application 222. The pre-scheduler 218 may make one or more entries in a queue, in which each queue entry corresponds to a location of a message in message persistence 230*b*. The messages may be transmitted in order by reading the queue entries with message locations (e.g., a memory location at message persistence 230*a*), and then transmitting the messages at each of those locations.

Once the messages have been scheduled in a queue by pre-scheduler 218, a delivering process calls the post-scheduler 220, which reads the queue at pre-scheduler 218; retrieves messages from message persistence 230*b* at the locations indicated by the queue at pre-scheduler 218; prepares messages for processing by receiving application 222; and provides messages to receiving application 222 for message processing. The receiving application 222 may then respond to the sending application 202 by sending a response message to sending application 202 using reliable messaging mechanisms, as described above.

Returning to FIG. 1, at 140, if the sending and receiving applications are on the same computer, the sending application sends request message(s) to the receiving application as a local call. In some implementations, the request message (e.g., a SOAP request message) is sent as a local API call.

Figure 3:
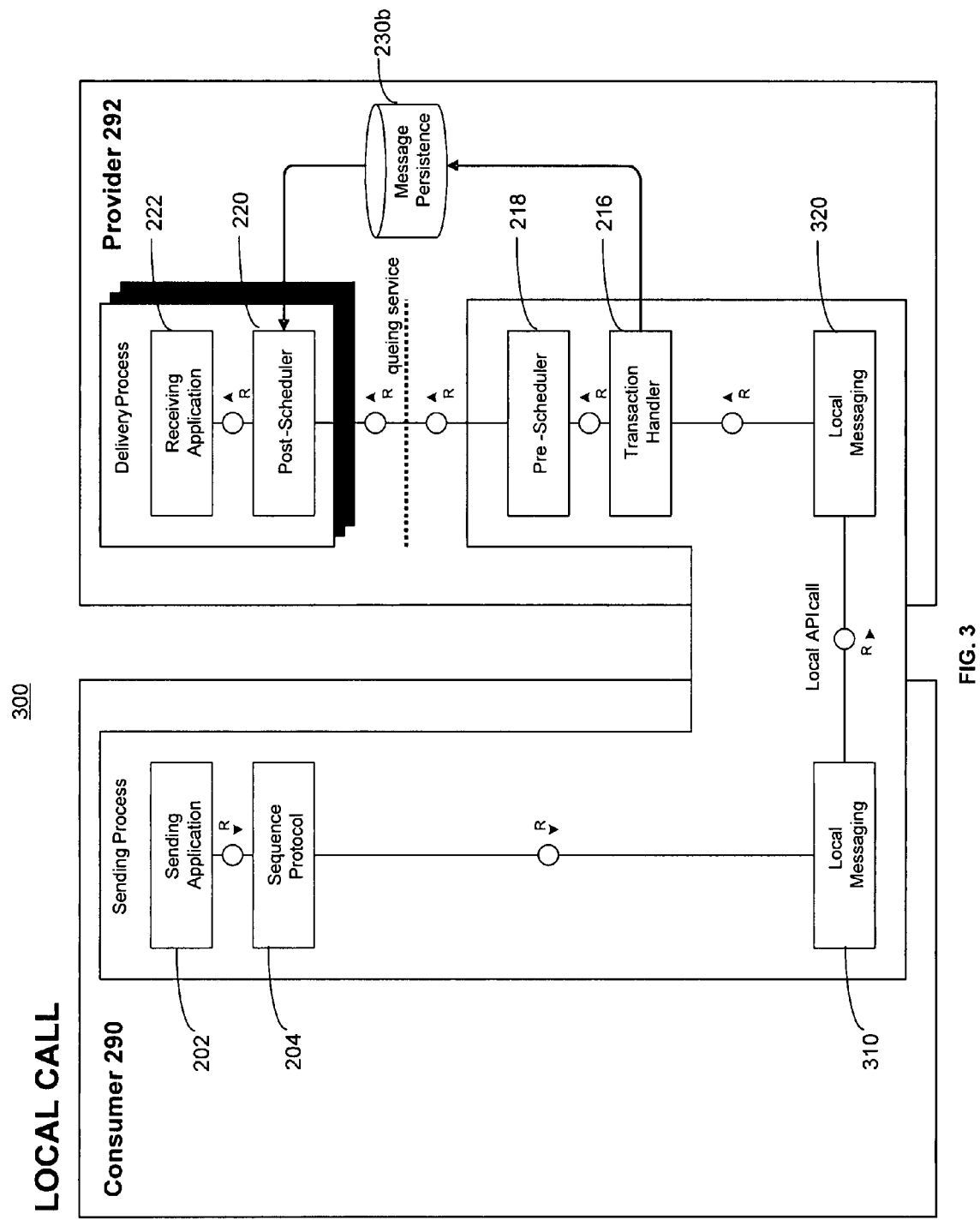
FIG. 3 is a block diagram of a system for making a local call.

FIG. 3 depicts a system 300 depicting consumer 290 and provider 292 configured for a local call, such as the local call described above at 140.

The consumer 290 includes sending application 202. When sending application 202 and receiving application 222 are on the same computer and sending application makes a call to receiving application 222, sending application 202 processes that call as a local call by first sending a request message (or messages) to sequence protocol 204. The sequence protocol 204 opens a new sequence or reopens an existing sequence and assigns the message (or messages) to the sequence. Next, the message is sent to a local messaging component 310.

The local messaging component 310 makes a call to a local API at provider 292. The local API call is then processed by a local messaging component 320 at provider 292. The local messaging components 310 and 320 transmit the necessary information that is needed at provider 292 to process the message. For example, the information may include the URL to address the service, the SOAP action, and the SOAP body. As the consumer 290 and the provider 292 share the same process in a local call scenario, all the information is made available in memory. The local messaging components may collect the information in a way that simulates the format of the information provided by the transport layer in a remote call scenario, so that other processing components at provider 292 can access the information independently of the scenario type (e.g., without regard to whether the call is a local call or a remote call). As the quality of service of "exactly once" and "exactly once in order" are fulfilled automatically for local API calls, there is no need for further mechanisms to ensure that these quality of service parameters are being fulfilled.

Transaction handler 216 receives messages and stores them in message persistence mechanism 230*b* to enable recreation of the correct order of messages sent by consumer 290.

The messages are next processed by a pre-scheduler 218. The pre-scheduler 218 schedules the messages for processing by receiving application 222. The pre-scheduler 218 may make one or more entries in a queue, in which each queue entry corresponds to a location of a message in message persistence 230*b*. The messages may be transmitted in order by reading queue entries with locations of messages (e.g., a memory location at message persistence 230*a*), and then transmitting the messages at those locations.

Once the messages have been scheduled in a queue by pre-scheduler 218, a delivering process calls the post-scheduler 220, which reads the queue at pre-scheduler 218; retrieves messages from the message persistence 230*b* at the locations indicated by the queue at pre-scheduler 218; prepares the messages for processing by receiving application 222; and provides the messages to receiving application 222 for processing. The receiving application 222 may then respond to the sending application 202. When that is the case, the receiving application 222 may send a response message to sending application 202 using a local call, as described above.

In some implementations, when provider 292 receives a call, provider 292 creates a node (or instance) of the provider 292 to process and/or respond to the call.

When both the consumer 290 and provider 292 coexist on the same system, performance benefits may be obtained by eliminating some of the aspects of reliable messaging (e.g., by passing persistence and queuing of messages) at consumer 290. To that end, the consumer 290 may make a local call, such as a local API call, instead of a WS-RM.

In systems where synchronous calls are a requirement, in one implementation, an http call is made to a predetermined location (e.g., http://none) to indicate that the call is a local call.

In some implementations, the execution of a so-called short cut is a property of the configuration of consumer 290. For example, executing a method via a local call may be implemented as a property of consumer 290 by configuring a logical port to recognize the local call. The property "local call" may be configured as a transport binding feature, so that synchronous calls may be performed with an http destination of "NONE" and asynchronous calls are executed via local API.

Moreover, the configuration of consumer 290 may include configuring a callable API interface to execute a remote call at 137 using components depicted at FIG. 2 and include configuring a callable API interface to execute a local call at 140 using the components depicted in FIG. 3. The configurations depicted in FIGS. 2 and 3 (including their callable APIs) may be performed during a so-called "design time." Design time refers to any time other than runtime, which is when consumer 290 makes a call to provider 292. In some implementations, these configurations of consumer 290 and provider 292 may be performed in an automated way using a configuration mechanism, such as an Enterprise Service Directory, available from SAP AG, or the configurations may be performed manually.

When the client side (e.g., consumer 290) is configured with the property "local call," in some implementations a predetermined name for the logical port for the local call is "NONE," although other names for the logical port may be used. The predetermined name "NONE" may thus be reserved for logical ports for local calls.

In some implementations, sending application 202 does not need to classify the sequence as "local" or "remote". Instead, that classification takes place later when the sequence is reopened via the sequence protocol 204. At that point in time, the sequence protocol 204 is created for a certain proxy object, so the proxy class and the logical port are known, so it is clear whether the sequence is used for a local call or a remote call.

Although FIG. 3 depicts message persistence 230b and queuing at provider 292 during a local call, message persistence and queuing may be provided instead at he consumer 290.

Referring again to FIG. 2, sending application 202 may be implemented as any interface that enables a user to interact with an application or a program (e.g., receiving application 222) through network 150. The sending application 202 may be implemented as a browser, such as Netscape Navigator or the like, or any other type of graphical user interface. In some implementations, SAP Web Dynpro (commercially available from SAP AG, Walldorf, Germany) may be used as a model-based development environment for generating sending application 202, although other development environments may be used.

Network 150 may be any type of communications mechanism and may include, alone or in any suitable combination, the Internet, a telephony-based network, a local area network (LAN), a wide area network (WAN), a dedicated intranet, wireless LAN, an intranet, a wireless network, a bus, or any other communication mechanisms. Further, any suitable combination of wired and/or wireless components and systems may provide communication link 150. Moreover, network 150 may be embodied using bi-directional, unidirectional, or dedicated communication links. Network 150 may also support standard transmission protocols, such as Transmission Control Protocol/Internet Protocol (TCP/IP), Hyper Text Transfer Protocol (HTTP), SOAP, WS-RM, RPC, or other protocols.

Although FIGS. 2 and 3 are described with respect to a consumer-provider architecture, systems 200 and 300 may also use any other architecture or framework. In some implementations, one or more components of consumer 290 or provider 292 may not be used. Moreover, the process described above with respect to FIG. 1 may be used with a single message or with multiple messages.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A non-transitory computer-readable medium containing instructions to configure a processor to perform a method, the method comprising:
   initiating a call from a first application to a second application by at least sequencing a plurality of messages by sequencing the plurality of messages to be sent to the second application, each message including information identifying the second application;
   determining whether the first application is local to the second application;
   making a first call as a local call to the second application bypassing a transaction handler and a message persistence for the sequenced plurality of messages, when the results of the determining indicate the first and second applications are local to the same computer, wherein making the first call as the local call further comprises:
      making the local call using a hypertext transfer protocol with a predetermined destination having a value of none; and
      making the local call by calling an application program interface to bypass queuing associated with the first application, to bypass persistence associated with the first application, and to use queuing and persistence associated with the second application; and
   making a second call as a remote call to the second application, when the results of the determining indicate the first application is on a first computer and the second applications is on a second computer, wherein the first and second computers are separate computers, wherein the remote call uses a hypertext transfer protocol including a location comprising at least one of a uniform resource locator or a uniform resource identifier representative of the second application, wherein the making of the second call further comprises:
      sending, by the transaction handler to the message persistence, a portion of the sequenced plurality of messages, the portion comprising a logical unit of work, wherein the transaction handler and the message persistence are implemented on the first computer;
      storing, by the message persistence, the portion comprising a logical unit of work; and
      scheduling, by a scheduler at the first computer, transmission of the portion to the second application.

2. The non-transitory computer-readable medium of claim 1, wherein making the call as the local call further comprises:
   making the local call using a hypertext transfer protocol with a predetermined destination, wherein the second application comprises a database application.

3. The non-transitory computer-readable medium of claim 2 further comprising:
   using, as the predetermined destination, a value of none.

4. The non-transitory computer-readable medium of claim 1, wherein making the call as the local call further comprises:
   making the local call by calling an application program interface to bypass queuing associated with the first application, to bypass persistence associated with the first application, and to use queuing and persistence associated with the second application.

5. The non-transitory computer-readable medium of claim 1, wherein making the call as the remote call further comprises:
making the remote call using a hypertext transfer protocol including a location.

6. The non-transitory computer-readable medium of claim 5 further comprising:
using, as the location, at least one of a uniform resource locator or a uniform resource identifier representative of the second application.

7. The non-transitory computer-readable medium of claim 5 further comprising:
making the remote call using Web Services Reliable Messaging.

8. The non-transitory computer-readable medium of claim 1, wherein initiating further comprising:
initiating the call from the first application implemented as a user interface application to the second application implemented as a web service.

9. The non-transitory computer-readable medium of claim 1, wherein determining further comprises:
determining a location of the second application;
determining the first application is local to the second application, when the first and second applications are on the same computer; and
determining the first application is remote to the second application, when the first and second applications are on separate computers coupled by a network.

10. A computer-implemented method comprising:
initiating a call from a first application to a second application by at least sequencing a plurality of messages by sequencing the plurality of messages to be sent to the second application, each message including information identifying the second application;
determining whether the first application is local to the second application;
making a first call as a local call to the second application bypassing a transaction handler and a message persistence for the sequenced plurality of messages, when the results of the determining indicate the first and second applications are local to the same computer, wherein making the first call as the local call further comprises:
making the local call using a hypertext transfer protocol with a predetermined destination having a value of none; and
making the local call by calling an application program interface to bypass queuing associated with the first application, to bypass persistence associated with the first application, and to use queuing and persistence associated with the second application; and
making a second call as a remote call to the second application, when the results of the determining indicate the first application is on a first computer and the second applications is on a second computer, wherein the first and second computers are separate computers, wherein the remote call uses a hypertext transfer protocol including a location comprising at least one of a uniform resource locator or a uniform resource identifier representative of the second application wherein the making of the second call further comprises:
sending, by the transaction handler to the message persistence, a portion of the sequenced plurality of messages, the portion comprising a logical unit of work, wherein the transaction handler and the message persistence are implemented on the first computer;
storing, by the message persistence, the portion comprising a logical unit of work; and
scheduling, by a scheduler at the first computer, transmission of the portion to the second application.

11. The computer-implemented method of claim 10, wherein making the call as the local call further comprises:
making the local call using a hypertext transfer protocol with a predetermined destination.

12. The computer-implemented method of claim 11 further comprising:
using, as the predetermined destination, a value of none.

13. The computer-implemented method of claim 10, wherein making the call as the local call further comprises:
making the local call by calling an application program interface to bypass queuing associated with the first application, to bypass persistence associated with the first application, and to use queuing and persistence associated with the second application.

14. The computer-implemented method of claim 10, wherein making the call as the remote call further comprises:
making the remote call using a hypertext transfer protocol including a location.

15. The computer-implemented method of claim 14 further comprising:
using, as the location, at least one of a uniform resource locator or a uniform resource identifier representative of the second application.

16. The computer-implemented method of claim 15 further comprising:
making the remote call using Web Services Reliable Messaging.

17. The computer-implemented method of claim 10, wherein initiating further comprising:
initiating the call from the first application implemented as a user interface application to the second application implemented as a web service.

18. The computer-implemented method of claim 10, wherein determining further comprises:
determining a location of the second application;
determining the first application is local to the second application, when the first and second applications are on the same computer; and
determining the first application is remote to the second application, when the first and second applications are on separate computers coupled by a network.

19. A system comprising:
a processor; and
a memory, wherein the processor and the memory are configured to perform operations comprising:
initiating a call from a first application to a second application by at least sequencing a plurality of messages by sequencing the plurality of messages to be sent to the second application, each message including information identifying the second application;
determining whether the first application is local to the second application; making a first call as a local call to the second application bypassing a transaction handler and a message persistence for the sequenced plurality of messages, when the results of the determining indicate the first and second applications are local to the same computer, wherein making the first call as the local call further comprises:
making the local call using a hypertext transfer protocol with a predetermined destination having a value of none; and
making the local call by calling an application program interface to bypass queuing associated with the first application, to bypass persistence associated with the first application, and to use queuing and persistence associated with the second application; and making a second call as a remote call to the second application, when the results of the determining indicate the first application is on a first computer and the second applications is on a second computer, wherein the first and second computers are separate computers, wherein the remote call uses a hypertext transfer protocol including a location comprising at least one of a uniform resource locator or a uniform resource identifier representative of the second application, wherein the making of the second call further comprises:

sending, by the transaction handler to the message persistence, a portion of the sequenced plurality of messages, the portion comprising a logical unit of work, wherein the transaction handler and the message persistence are implemented on the first computer;

storing, by the message persistence, the portion comprising a logical unit of work; and scheduling, by a scheduler at the first computer, transmission of the portion to the second application.

* * * * *